United States Patent [19]
Boehm et al.

[11] Patent Number: 5,163,306
[45] Date of Patent: Nov. 17, 1992

[54] GARMENT BLANK, BRIEF, AND METHOD OF MAKING

[75] Inventors: Thierry Boehm, Dracy St. Loup; Daniel Boursier, Brion; Sylvain Houillon, Saint-Pierre, all of France

[73] Assignee: Sara Lee Corporation, Winston-Salem, N.C.

[21] Appl. No.: 710,966

[22] Filed: Jun. 6, 1991

[51] Int. Cl.⁵ .................................................. A41B 9/04
[52] U.S. Cl. ............................................... 66/177; 2/406
[58] Field of Search .................... 66/173, 177; 2/78 R, 2/400, 402, 406

[56] References Cited

U.S. PATENT DOCUMENTS

| | | | |
|---|---|---|---|
| 2,730,880 | 1/1956 | Larkin | 66/95 |
| 2,785,552 | 3/1957 | Larkin | 66/41 |
| 3,800,563 | 4/1974 | Billi | 66/173 X |
| 4,010,627 | 3/1977 | Pernick | 66/177 |
| 4,014,186 | 3/1977 | Ferraguti | 66/173 X |
| 4,038,699 | 8/1977 | Burn | 66/173 X |
| 4,043,156 | 8/1977 | Pernick | 66/177 |
| 4,624,115 | 11/1986 | Safrit et al. | 66/172 R |
| 4,663,946 | 5/1987 | Wright | 66/177 |
| 4,872,324 | 10/1989 | Rearwin et al. | 66/177 X |

FOREIGN PATENT DOCUMENTS

| | | | |
|---|---|---|---|
| 506659 | 5/1976 | U.S.S.R. | 66/177 |
| 1320047 | 6/1973 | United Kingdom | 66/173 |

Primary Examiner—Werner H. Schroeder
Assistant Examiner—John J. Calvert
Attorney, Agent, or Firm—Charles Y. Lackey; William S. Burden

[57] ABSTRACT

A circular knit one-piece garment blank, brief, and method of making the same has a seamless body section and a double ply crotch integrally intermitted therewith in the form of a turned welt. The depending portion of the two ply crotch is sewn to the body section.

10 Claims, 2 Drawing Sheets

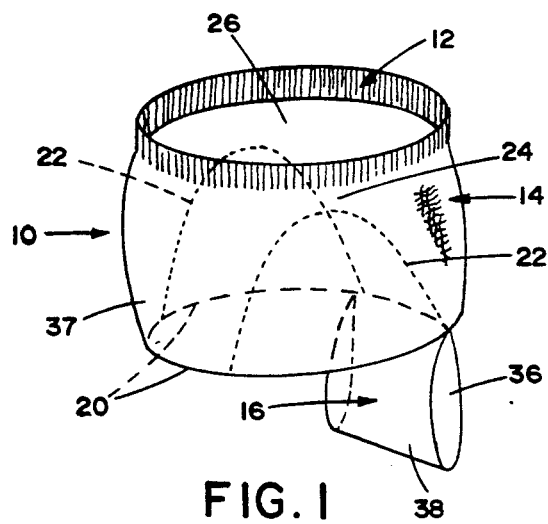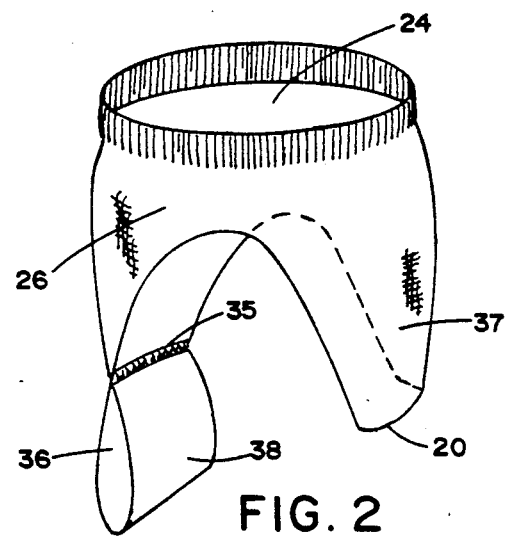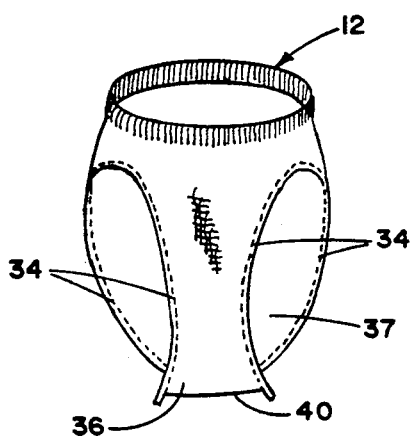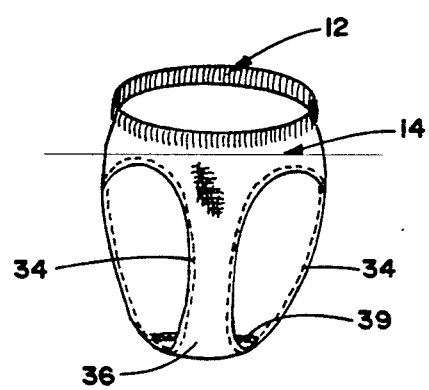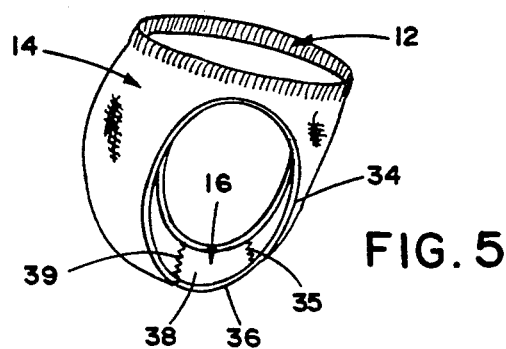

GARMENT BLANK, BRIEF, AND METHOD OF MAKING

BACKGROUND OF THE INVENTION

This invention relates generally to circular knit, tubular one-piece blanks and garments formed therefrom, such as briefs and panties, and to the method of forming the blanks and garments. More particularly, the invention relates to a knitted, seamless, tubular blank having a two ply crotch section and the forming of a body garment.

Heretofore, undergarments such as panties and briefs have generally been made from a plurality of component parts configured to the desired shapes and then sewn together. Such garments made by the "cut and sew" methods are expensive to manufacture due to the labor costs involved in accurately cutting and seaming the components and due to the waste of materials.

Efforts have been made to reduce labor and fabric waste by knitting a plurality of blanks as disclosed, for example, in U.S. Pat. No. 4,663,946. The side-by-side knit blanks are in the form of a tube which is slit walewise to form two blanks. Each blank is then folded and sewn resulting in seams along both sides of the garment. U.S. Pat. No. 4,624,115 discloses a seamless knit tubular blank wherein the blank is provided with visual cutting guides formed during the knitting operation, which serve to facilitate an operator in removing fabric portions from the blank to impart the requisite shape for forming the garment therefrom. As disclosed in U.S. Pat. No. 4,043,156, an undergarment is made from a rotary knitted blank having a body section and discreet depending panels. Knitting is continued upon spaced groups of needles. Portions of the panels are overlapped and sewn together to shape the blank into a garment. In each of U.S. Pat. Nos. 4,043,156 and 4,624,115 the portion of the garment is formed by sewing together depending front and rear panels of the blanks.

BRIEF SUMMARY AND OBJECTS OF THE INVENTION

In accordance with this invention, a circular knitting machine knits a given number of courses in the forming of a body portion of a panty or brief. Interknitted integrally with the body portion is a two ply crotch section of a desired width formed in the manner of a knitted or turned welt.

Initially, a turned welt is formed on a knitting machine as disclosed, for example, in U.S. Pat. Nos. 2,730,880; 2,785,552; and the like. Knitting machines for producing a loop in the fabric in the form of a turned welt are widely used in the industry and their construction and mode of operation are well known. The main body section of the blank is then knit followed by the knitting of the crotch section. The width of the crotch section may vary, as desired. In a preferred embodiment, the crotch section extends around approximately 25% of the body section. The crotch section is formed by knitting partial courses using the machine cylinder needles and dial bits in the manner of forming the loop portion of a knitted welt, with the length of the double ply crotch section being variable depending upon the desired size, style, etc. of the garment. The amount of fabric forming the body section may also be varied depending upon size and style of the garment. The crotch section and the body section may then be cut to the desired size and shape or contour prior to sewing the crotch section to the back of the body section.

One of the primary objects of the invention is the provision of a simplified and improved unitary brief or panty type garment having a two ply crotch section interknitted with the garment body section.

Another object of the invention is the provision of a one-piece brief or panty having no seams at the juncture of the body with the two ply crotch resulting in a garment of improved appearance.

Still another object of the invention is the provision of an improved method of forming the garment in a novel manner upon a circular knitting machine resulting in a simplified and improved garment structure.

A further object of the invention is the provision of a one-piece brief or panty type garment having a two ply crotch which may economically knit on a circular knitting machine. In order to make the body section more nearly conform to the shape of the body of the wearer during the knitting process and to save material, certain portions of the body section may be knit of partial courses.

Other objects and advantages of the invention will become apparent when considered in connection with the following description and drawings.

BRIEF DESCRIPTION OF THE DRAWINGS

FIG. 1 illustrates a perspective view of a blank of this invention formed by a circular knitting machine;

FIG. 2 illustrates the blank of FIG. 1, rotated about the vertical axis approximately 180°, and having fabric cut and removed to define leg openings;

FIG. 3 is a front view of the blank having the crotch section cut to the desired contour and having suitable trimming sewn in place around the leg openings;

FIG. 4 is a front view of a knitted one-piece garment of the present invention;

FIG. 5 is a perspective view of the garment of FIG. 4;

DESCRIPTION OF THE INVENTION

Figure 6:
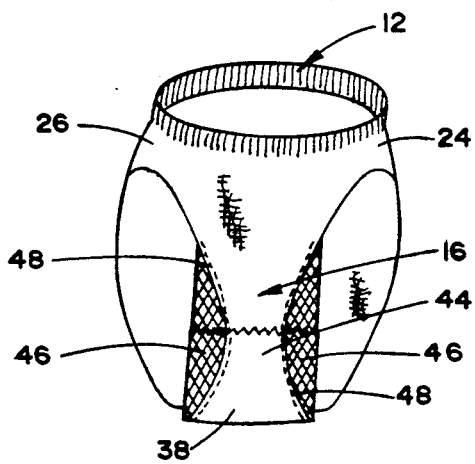
FIG. 6 is a front view of a garment blank formed in accordance with the present invention which has been turned inside out and illustrating guide lines in the crotch section.

As illustrated in FIG. 1, a unitary, seamless knit, tubular garment blank 10 of the present invention includes a waistband 12, a plurality of 360° courses forming a lower trunk engaging body section 14, and a crotch section 16 integrally knit with and extending from the body section 14.

The waistband 12 may be in the form of a transfer or double welt and may include elastic material. The fabric which forms the turned welt is knit on cylinder needles and dial bits in a well known manner. This is followed by the knitting of the tubular body section 14 down to a given course 20 where a majority of the needles discontinue knitting (pressed off) and remaining needles extending around approximately 25% of the cylinder continue to knit so as to form the crotch section 16.

Throughout the specification and claims the terms "upper", "lower", "side", "front" and "back" used in referring to the garment and garment blank are based on the garment as worn on the body.

The length and diameter of the body section 14 may be varied, as desired, to provide the particular desired shape or contour, size and style of the finished garment. The body fabric may be of one or more suitable yarns and stitch constructions.

Preferably guide lines 22 are provided on each side portion 24, 26 of the body section for serving as cutting guides for removing fabric to define leg openings. The guide lines 22 may be formed during the knitting process in any suitable manner e.g., by tuck stitches as disclosed, for example, in U.S. Pat. No. 4,624,115.

Figure 9:
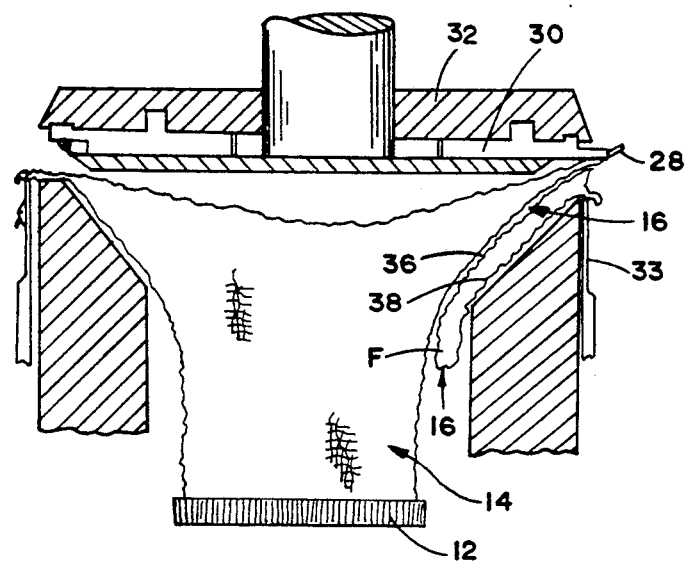
FIG. 9 is a fragmentary transverse sectional view of a knitting machine, needles, needle cylinder, dial and dial bits, and illustrating the formation of the crotch section.

At the last course 20, needles around approximately 75% of the knitting circle are pressed off while the remaining needles and dial jacks cooperate in a conventional manner, as in the construction of a turned welt to form the double ply crotch section 16. The fabric of the crotch section extends around approximately 25% of the knitting circle and has portions held by hooks 28 on the dial jacks 30, FIG. 9, while knitting continues on selected needles 33. The length of the fabric F for forming the plies of the crotch section 16 may vary in length. After a predetermined amount of fabric F is made, the yarn held by the hooks 28 is transferred to selected needles 33 and looped together as shown by numeral 35, FIG. 2, to interlock the two plies of the crotch section adjacent the course 20. The inner and outer plies 36, 38 may be of the same or different yarns and yarn constructions.

The body section 14 of the blank 10 of FIG. 1 may then be severed along or adjacent guide lines 22, 22 on the sides and front of the blank to define leg openings, and the crotch section 16 may be cut to the desired contour, as shown by FIG. 3. Suitable trimmings 34 may then be sewn along the severed edges of the crotch and body sections as shown by FIG. 3. The free end portion 40 of the shaped double ply crotch is sewn to lowermost edge portions of the back portions 37 of the body section by stitching 39 resulting in a garment as shown by FIGS. 4 and 5.

FIG. 6 illustrates a garment blank according to the present invention which has been turned inside out and illustrating the crotch being knit of two different interknit fabric constructions 44, 46. The juncture 48 of the two fabric constructions serves as a guide line for assisting in cutting the crotch section 16 to the desired contour.

Figure 7:
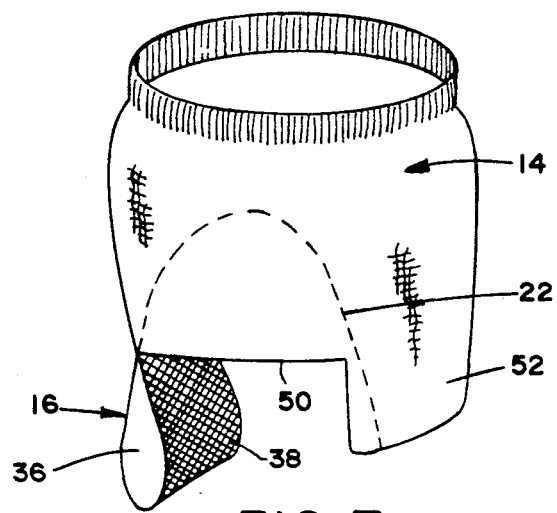
FIG. 7 is a perspective view of a modified embodiment of a garment blank of this invention.

FIG. 7 illustrates another embodiment of a unitary tubular knit garment blank according to the invention wherein, in order to save material, the body section 14 is knit down to a given course 50 and selected needles are pressed off and other selected needles continue to knit a rear or back panel 52. The sides 24, 26 and rear panel 52, and crotch 16 are severed to the desired contour to define leg openings.

Figure 8:
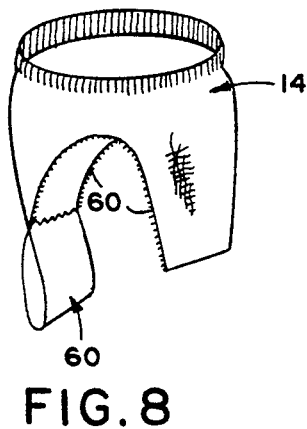
FIG. 8 is a perspective view of another embodiment of a garment blank of the present invention.

FIG. 8 illustrates another embodiment of the invention wherein the body section 14 is knit in a particular manner on the sides 24, 26 to save raw material and require less cutting in defining leg openings. The leg openings may be formed as disclosed in U.S. Pat. No. 4,010,627 with the edges having short fringe-like lengths of yarn 60. The crotch section inner ply 38 may be of cotton yarn. The yarns and yarn constructions of the inner and outer plies may vary as required. The change from one type of yarn to another may be made at any time during the knitting of the fabric loop F which forms the two plies.

It will be understood that the details of construction and procedure of the invention set forth herein are merely by way of example and the invention is to be limited only by the scope of the appended claims.

What is claimed is:

1. A unitary seamless knit blank for use in forming panties of briefs, said blank having a seamless tubular knitted body section of predetermined length, said body section having wales and courses formed of suitable yarn and having a predetermined section having a terminal course, and a nontubular single unitary crotch section of two plies formed unitarily with and depending from said terminal course and interknitted integrally with said body portion, said two plies being integrally knitted together and formed of partial courses.

2. A unitary seamless knit blank as recited in claim 1, wherein said crotch section is formed of partial courses in the manner of a turned welt.

3. A unitary seamless blank as set forth in claim 1, wherein cutting guide lines for leg openings are knit into said body section.

4. A unitary seamless blank as set forth in claim 1 wherein said terminal course is a complete 360° course.

5. A unitary seamless blank as set forth in claim 1 wherein said terminal course is a partial course.

6. A method of making a blank to be used in the manufacture of briefs or panties comprising: knitting a number of courses on a circular knitting machine so as to form a tubular body section terminating in a final course; pressing off stitches in the final course of said tubular body section around at least a selected portion of said final course; and continuing knitting to a preselected portion of said final course, in the manner of a turned welt, to form a two-ply crotch section interknitted integrally with said body section.

7. The method of claim 6, and further including the steps of cutting partial leg opening symmetrically into the tubular body section and sewing one end of the two ply crotch section to said tubular body section to define leg openings.

8. The method of making a blank to be used in the manufacture of briefs or panties comprising: knitting a plurality of successive 360° courses on a circular knitting machine to form a tubular fabric body section terminating in a final course; pressing off stitches around at least one selected portion of the final course of said tubular body section; continuing knitting a turned welt fabric section along a prescribed portion of the final course of said tubular body section to create an elongated crotch section of two integrally knit plies; and interlocking together the two plies of the crotch section adjacent to the final course of said tubular body section.

9. The method of making a garment blank to be used in the manufacture of briefs comprising: knitting a plurality of successive courses on a circular knitting machine to define a fabric garment blank body portion having a terminal course; pressing off stitches around a first selected portion of said terminal course of said blank body portion; retaining selected stitches around a second selected portion of said terminal course of said blank body portion while continuing knitting along the second selected portion of said terminal course to form a crotch section of two plies; and interlocking the two plies of crotch section and the body portion adjacent said terminal course.

10. A panty or brief comprising: a tubular knit body section having a series of successive 360° courses, and a final course at the bottom of said body section, said final course at the bottom of said body having at least one selected area of pressed off stitches for a given number of degrees around said final course; an integrally knit two-ply crotch piece having a first end portion interknitted integrally with said body section final course, and having a second end portion sewn to said tubular body section so as to form leg openings, said two-ply crotch piece comprising a single fabric piece folded to define overlying plies.

* * * * *